ALFRED F. STAHLER
INVENTOR.

BY Robert G. Clay

ATTORNEY

ALFRED F. STAHLER
INVENTOR.

BY Robert G. Clay

ATTORNEY

ALFRED F. STAHLER
INVENTOR.

BY Robert G. Clay

ATTORNEY

ALFRED F. STAHLER
INVENTOR.

BY Robert H. Clay

ATTORNEY

ALFRED F. STAHLER
INVENTOR.

BY Robert S. Clay

ATTORNEY

ALFRED F. STAHLER
INVENTOR.
BY Robert G. Clay
ATTORNEY

ALFRED F. STAHLER
INVENTOR.

BY Robert G. Clay

ATTORNEY

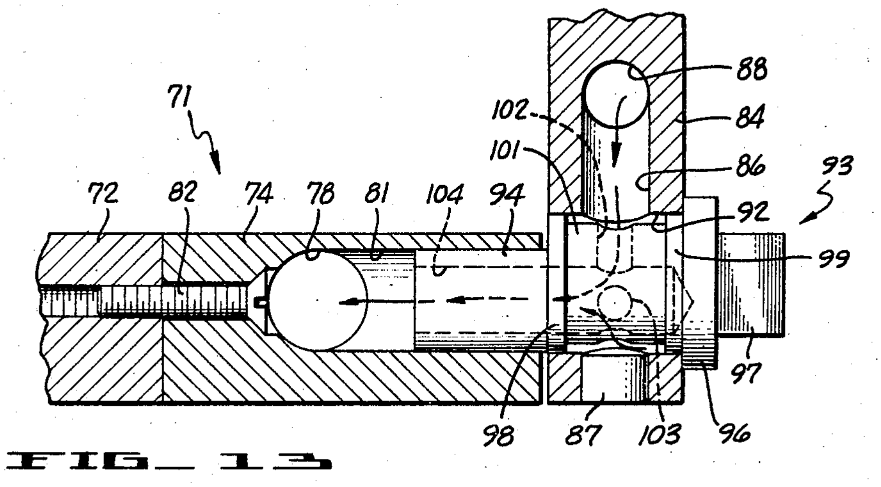
FIG. 13
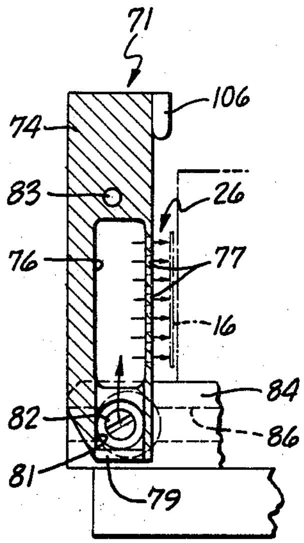
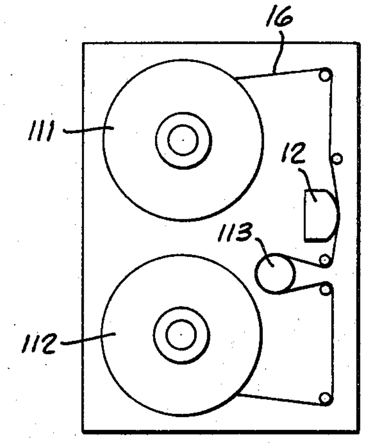
FIG. 15
FIG. 14
ALFRED F. STAHLER
INVENTOR.
BY Robert S. Clay
ATTORNEY ALFRED F STAHLER
INVENTOR.
BY Robert G. Clay
ATTORNEY United States Patent Office 3,435,441

Patented Mar. 25, 1969

3,435,441

FLUID LUBRICATED MAGNETIC TAPE TRANSDUCER

Alfred F. Stahler, San Jose, Calif., assignor to Ampex Corporation, Redwood City, Calif., a corporation of California Filed Mar. 29, 1965, Ser. No. 443,190
Int. Cl. G11b *5/72, 5/78;* G11c *11/02*
U. S. Cl. 340—174.1 11 Claims

ABSTRACT OF THE DISCLOSURE

An air bearing is provided for magnetic tape moving across a magnetic transducing head. The bearing may be self-acting or externally-pressurized, and is adjustable to a relatively large head-to-tape spacing, which is reduced locally at the head gaps by means of pressurized air jets directed at the tape from the side thereof opposite the head. Besides preserving the adjustability of the head-to-tape spacing, this arrangement of jets provides a spacing that, once adjusted, remains constant despite changes in tape tension or changes in type and physical characteristics of the tape used.

This invention relates to fluid lubricated magnetic tape transducers, and particularly to such transducers providing a fluid film of controllable thickness.

In the magnetic tape recording and reproducing art, it is usual to move a tensioned foil or tape across a magnetic transducer and in pressurized contact therewith to secure the smallest possible spacing between the transducer and the magnetic oxide coating of the tape, the strength of the recorded or reproduced signal being an inverse function of this spacing. However, such physical contact causes frictional wear of the expensive transducer surfaces, gradually changing their operating characteristics, which alone is undesirable, and eventually causing failure of the transducers, often within a few thousand hours of use. The friction also wears the tape oxide, causing increasing loss of information and eventual destruction.

To overcome this problem it has been proposed to lubricate the tape at the transducer head by means of self-acting air bearings such as have been previously used to reduce the wear of tape in passage over various guide posts of a transport. In such bearings, the moving tape itself drags air into and compresses it into a "film" in the region between the tape and the bearing post or transducer. The film thickness or spacing $h$ that results between the tape and transducer of course reduces the strength of the signal, but not to an intolerable degree. However, the spacing $h$ is a function of various transport and tape parameters, such as head radius of curvature, tape speed and tension, and the characteristics of the particular piece of tape being used. If one is limited to certain combinations of such parameters and characteristics for reasons that have nothing to do with the head bearing, then one has only a correspondingly limited freedom to establish the spacing $h$ at a desired value. Furthermore, flutter variations of tape tension and speed occur in all transports, and so long as the spacing $h$ is a function of these parameters, it must inherit their inaccuracies. All considerations, therefore, urge that the spacing $h$ be controllable independently of, or in a way that is not exclusively dependent on, tape tension and speed, and individual tape and head characteristics. This object is not attainable with the self-acting air bearings known in the art.

The air-bearing guide post art, previously mentioned, also includes "externally-pressurized" bearings in which sources of pressurized air are coupled to provide an air and pressure supply for the bearing region in addition to the air and pressure supply created by the "self-acting" effect. In principle, control of the external pressure source would provide the desired independent control of the tape-to-bearing spacing $h$. However, the guide post art was concerned only with the problem of providing air bearings in the broadest sense, and not with the problem of maintaining a minimum spacing $h$, and a stable spacing $h$, at a particular point such as a transducer head gap.

Concurrently filed U.S. patent applications Ser. No. 442,860 and Ser. No. 442,859 by Joheph Ma et al. and Alfred F. Stahler, respectively, disclose bearings in which the air film thickness is controllable, as by controlling the air flow and pressure in a recess upstream from the transducing head. As set forth in these patent applications, the film thickness may be stable and quite small (e.g., 50 microinches) or much larger (e.g., 200–500 microinches) and possibly unstable. The smaller film thicknesses are preferable therefore both for stability and highest recording and reproducing efficiency. However the surface finish of the oxide tape coating and the finish of the head bearing surface usually are of the same dimensional order as the smaller film thicknesses, and some frictional rubbing occurs from time to time. Such rubbing is also caused at small film thicknesses by flutter variations in tape speed and tension. Another characteristic of the bearings disclosed in the above mentioned patent applications is that some adjustment is needed to maintain the same film thickness with different tapes, particularly with tapes made by different manufacturers, and with different tensions and speeds. Another characteristic of the bearings disclosed in the above mentioned patent applications is that they require an appreciable starting time before the ultimate film thickness is established.

Accordingly, it is an object of the present invention to provide a gas film bearing for foil in which a stable and small gas film thickness may be controllably established, which thickness is substantially constant for a wide range of tapes, tape tensions, and tape speeds without the need for further adjustment of the apparatus.

It is another object of the invention to provide a bearing as above described and producing a reduced amount of wear of the tape and confronting head bearing surface.

It is still another object of the invention to provide a bearing as above described and capable of start, stop and reversal of the tape with more rapid attainment of the desired gas film thickness than previously possible in the art.

These and other objects of the invention are accomplished in a structure in which a relatively thick (e.g., 200–300 microinch) gas film bearing is established between the tape and a bearing surface in which the transducing head is mounted, and the tape is locally depressed in the immediate vicinity of the head by means of a pressurized gas jet applied to the side of the tape opposite the head.

A better understanding of the invention and its various aspects may be had by reference to the following description, taken in conjunction with the accompanying drawings, in which:

FIGURE 13 is an enlarged plan section of a portion of the apparatus enclosed within lines 13—13 of FIGURE 10;

FIGURE 14 is a broken away elevation of a portion of the apparatus of FIGURE 12;

FIGURE 15 is a reduced-scale plan of a tape transport incorporating the apparatus of the invention;

Figure 1:
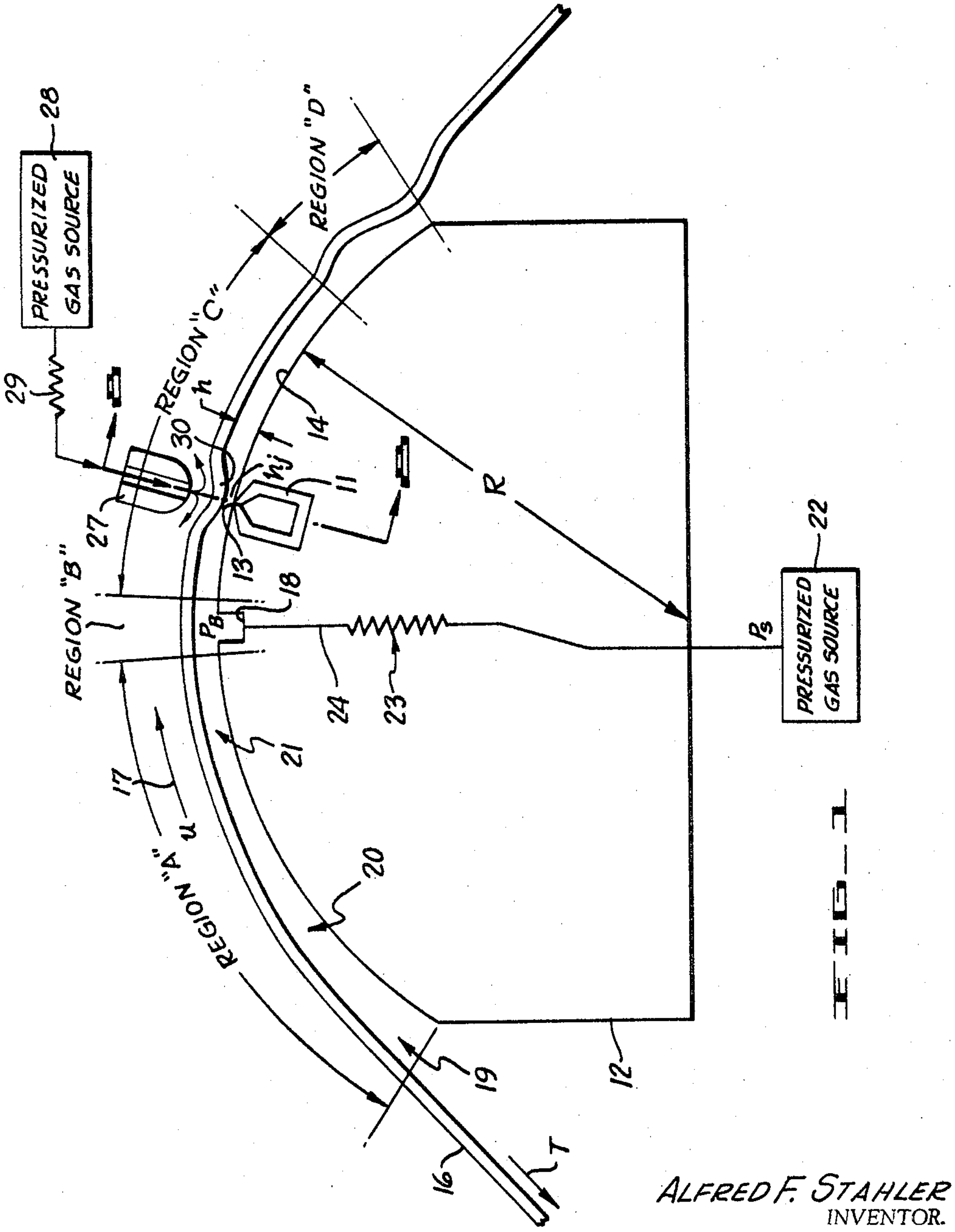
FIGURE 1 is a schematic cross-section of a bearing in accordance with the invention.

Referring now to FIGURE 1, there is schematically shown a gas bearing structure in accordance with the present invention. A magnetic transducing head 11 is mounted in a bearing block 12, with the head gap 13 lying on and facing outward from a salient curved bearing surface 14 of the block. The surface 14 has a radius R. A magnetic tape 16 in the form of a flexible or semi-flexible foil is arranged to confront the surface 14 and is tensioned to generally conform thereto and is moved around the curve of the surface 14 in the direction indicated by arrow 17. The tension in the tape is indicated by arrows T and the velocity by the letter U. The tape tensioning and moving means are not shown in this figure, but may be any means known in the art, such as capstans, pinch rollers and braked or driven reels. Upstream from the head 11 (with relation to the direction of motion 17 of the tape) there is provided a control groove 18 extending transversely to the direction of motion of the tape and having a length somewhat less than the width of the tape.

Before proceeding with further description of the structure shown in FIGURE 1, it will be of advantage to examine the basic operation of the elements thus far described. This structure when operating has certain well-defined regions A, B, C and D as shown, in which various effects take place. In region A a self-acting air bearing is established. The tape 16, approaching a point of tangency with the surface 14, frictionally entrains air from the surrounding atmosphere and compresses it in the narrowing, funnel-shaped entrance region 19 to form a bearing "film" of gas. Some variation takes place in the thickness of the film and of the spacing between the tape and surface 14 as the tape proceeds in a downstream direction and begins to conform to the curvature of the surface 14, as shown in region 20. However, eventually the air film becomes of constant pressure and thickness, and remains so as it moves downstream as shown in region 21, so long as the radius of curvature does not change. This constant thickness region is characteristic of self-acting foil bearings, and is established and maintained substantially despite lateral leakage of air from the edges of the tape, for the following reasons. Since the amount of entrained air is very small, the thickness of the air film is also quite small (e.g., 50–200 microinches) in relation to the dimensions of the tape segment that is supported by the air film and the block 12 (e.g., 1 inch wide by 2 inches long), so that in effect the volume of space between the tape and block 12 constitutes a restricted passage for the air. If the apparatus is viewed in cross-section (i.e., transverse to the direction of motion), it will be seen that the tape and block 12 define a restricted passage having a length (1 inch) on the order of 5000–20,000 times the height (50–200 microinches). The impedance of this passage to lateral flow and leakage of the air is so great that such lateral leakage as there may be has substantially no effect in reducing the film thicknes over most of the width of the tape, and substantially all of the pressurized air flows on through regions B and C and out of the bearing in the diverging exit region D where the tape becomes unstable. If it were not for the presence of the groove 18 in the present example, the region 21 of constant film thickness would extend through regions B and C. However, in the present structure the grove 18 constitutes a discontinuity in the surface 14 that alters the flow of the air in region B, and in effect establishes the beginning of a secondary self-acting bearing, resulting in a second region C of constant film thickness $h$. The dimensions and shape of the groove 18 may be varied to assist in controlling the film thickness $h$ in region C, where the transducer 11 is located. However such control is best exercized as part of the manufacturing process, and further means are needed for altering the flow of air at the groove 18 to control the downstream film thickness $h$ during actual operation of the apparatus.

This further means is shown in FIGURE 1 as including a pressurized gas source 22 coupled through a restrictor 23 and a passage 24 to the bottom of the groove 18. The source 22 may be adjustable to supply any predetermined pressure $P_S$ to the restrictor 23 and this pressure may be established at such a value that the pressure $P_B$ in the groove is either greater or less than the pressure $P_C=T/R$ under the tape in region C. If $P_S$ is greater than $P_B$ and $P_B$ is greater than $P_C$, there is flow of air from the source 22 into the groove 18, increasing the quantity of air flowing into region C and increasing the film thickness $h$ downstream from the groove. Under these circumstances the film thickness $h$ in region C may become somewhat unstable. However an extremely stable value of $h$ can be obtained by setting the pressure $P_S$ low enough to cause a flow of air out of the groove 18 and toward the source 22. In such an arrangement, the air flow into the groove from region A is divided, part being diverted toward the source 22 and part being carried on to region C. Since the quantity of air supplied to region C is thus reduced, the film thickness $h$ is correspondingly reduced, to a controllable degree dependent on the setting of pressure $P_S$.

It will be understood that diversion of some of the air out of the bearing by the source 22 is but one condition under which stability and control may be achieved, and that such stability and control may also be obtained under some circumstances by causing flow into the bearing from the pressure source. The essential condition for stability is the relationship established in the values of $P_B$ and $P_C$, i.e., the pressure in the groove and the pressure under the tape in region C downstream. So long as $P_B$ is equal to or less than $P_C$, the value of $h$ in region C is stable; but when $P_B$ is greater than $P_C$, the value of $h$ in region C is to some degree unstable. This phenomenon, among others, is illustrated by the following figure.

Figure 2:
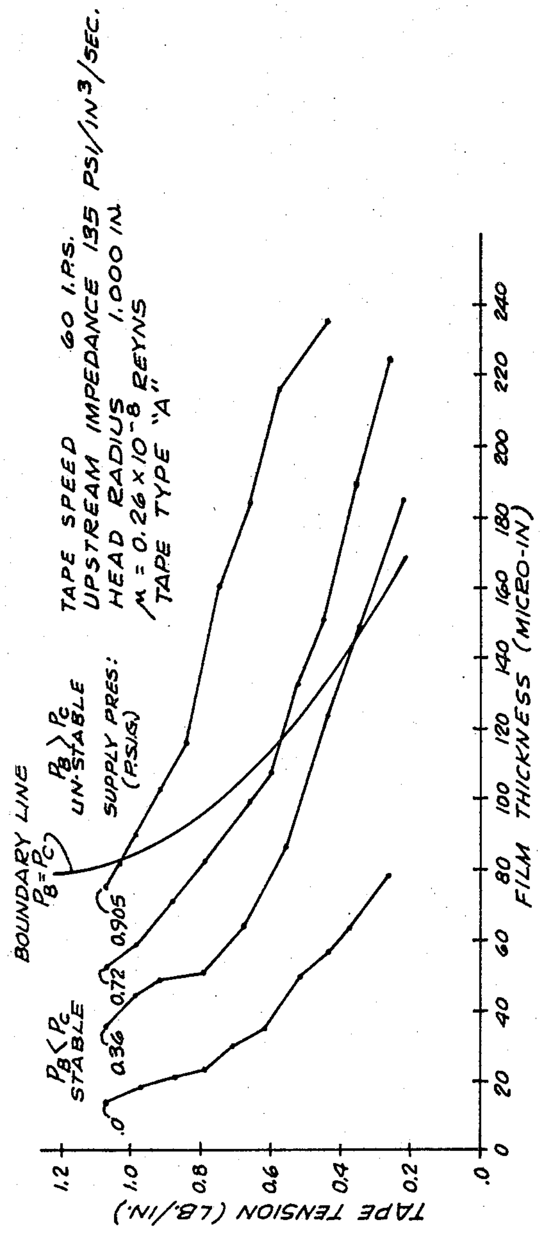
FIGURE 2 is a chart illustrating the operation of a portion of the apparatus of FIGURE 1.
Figure 3:
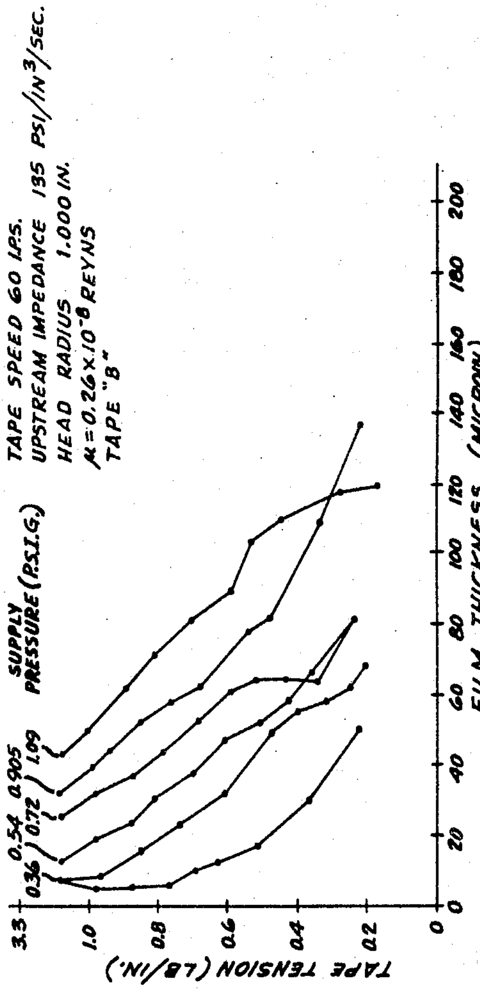
FIGURE 3 is a chart illustrating the operation of a portion of the apparatus of FIGURE 1.

In FIGURE 2 the performance of a bearing, constructed as above described, is plotted to show the action thereof with respect to a particular brand of tape A; and in FIGURE 3 the performance of the same bearing structure with tape B of a different manufacturer is shown.

Figure 4:
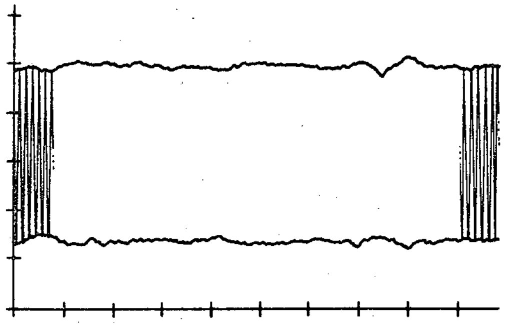
FIGURE 4 is a tracing of the envelope of an oscilloscope display illustrating the operation of a portion of the apparatus of FIGURE 1.
Figure 5:
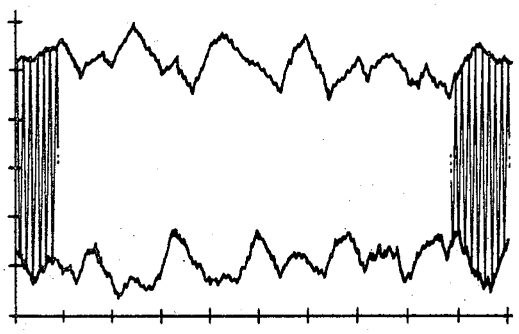
FIGURE 5 is a tracing of the envelope of an oscilloscope display illustrating the operation of a portion of the apparatus of FIGURE 1.

In plotting FIGURE 2, values of $P_B$ and $P_C$ were also experimentally measured and a line representing the boundary $P_B=P_C$ is plotted. In the area to the left of the boundary line, $P_B$ is everywhere less than $P_C$ and the film thickness $h$ is stable, as illustrated in FIGURE 4, which is a tracing of an oscilloscope display of 50 kc.

signal reproduced at 30 i.p.s. with the air bearing of the invention, and with $P_B$ less than $P_C$. In the area to the right of the boundary line $P_B=P_C$ (FIGURES 2 and 3), $P_B$ is everywhere greater than $P_C$, and the film thickness $h$ is unstable, as illustrated in FIGURE 5, which is a tracing of an oscilloscope display of the signal of FIGURE 4 when $P_B$ is greater than $P_C$.

With the structure so far described, it is clear that the same film thickness $h$ may be obtained with a wide range of tapes, tape speeds, and tape tensions, merely by suitably adjusting the restrictor 23 and/or pressure source 22. However, the present invention contemplates additional structure that eliminates or substantially reduces the need for such adjustment when it is necessary to change tapes, speeds or tensions.

Figure 7:
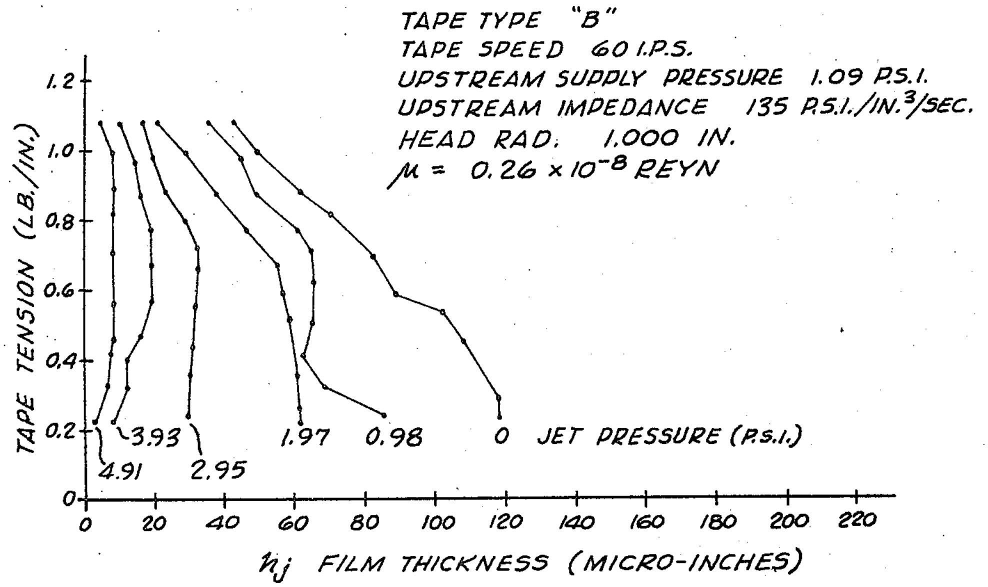
FIGURE 7 is a chart illustrating the operation of the apparatus of FIGURE 1.
Figure 6:
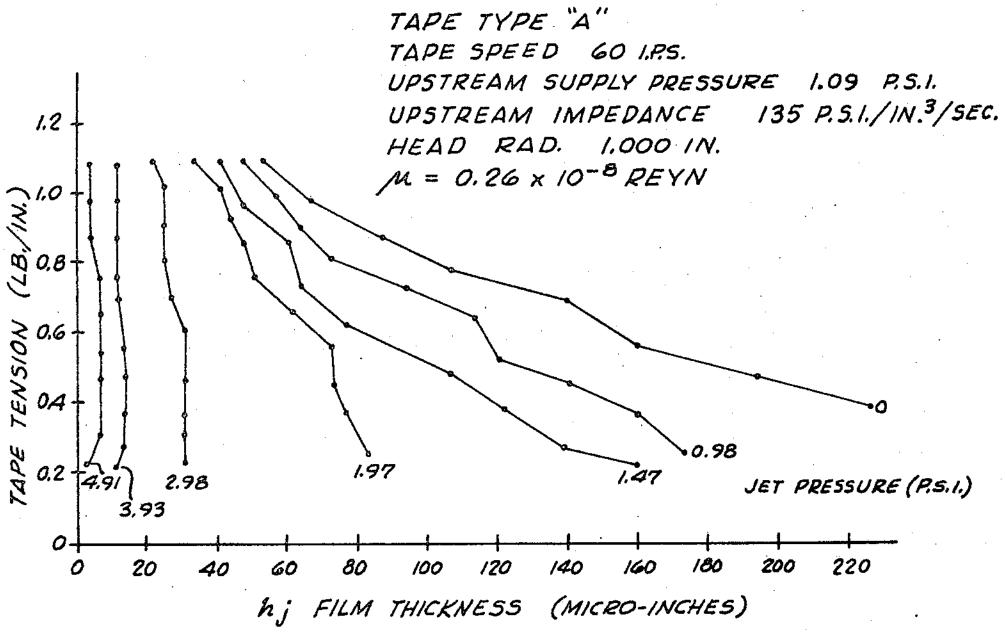
FIGURE 6 is a chart illustrating the operation of the apparatus of FIGURE 1.

Accordingly, as shown in FIGURE 1, there is provided an air jet 26 directed at the side of the tape opposite the head 11, in the immediate vicinity of the head, so as to locally depress the tape as shown. The jet 26 is provided by a nozzle 27 coupled to a pressurized gas source 28 through a restrictor 29. The apparatus is then operated with the desired head-to-tape spacing $h_j$, and with the spacing $h$ at a substantially greater value. This arrangement has the advantage that even occasional frictional rubbing of the tape on most of the surface 14 is virtually eliminated, for the film thickness elsewhere than under the jet is increased. Furthermore the film thickness $h_j$ is extremely stable, so as to be virtually uninfluenced by changes in tape or tape speed and tension, as shown in FIGURES 6 and 7. These figures show the performance of the same bearing structures and tapes as FIGURES 2 and 3, with the addition of the jet 26. In FIGURES 6 and 7 it is of signficance to note that at jet pressures of 2.95 p.s.i.g. and higher, the film thickness $h_j$ is virtually independent of tape tension, so that flutter variations of tension are virtually eliminated as an influence on the film thickness $h_j$; and that the two tapes A and B may be interchanged without changing the supply or jet pressures and virtually the same film thickness $h_j$ will always be obtained.

Figure 8:
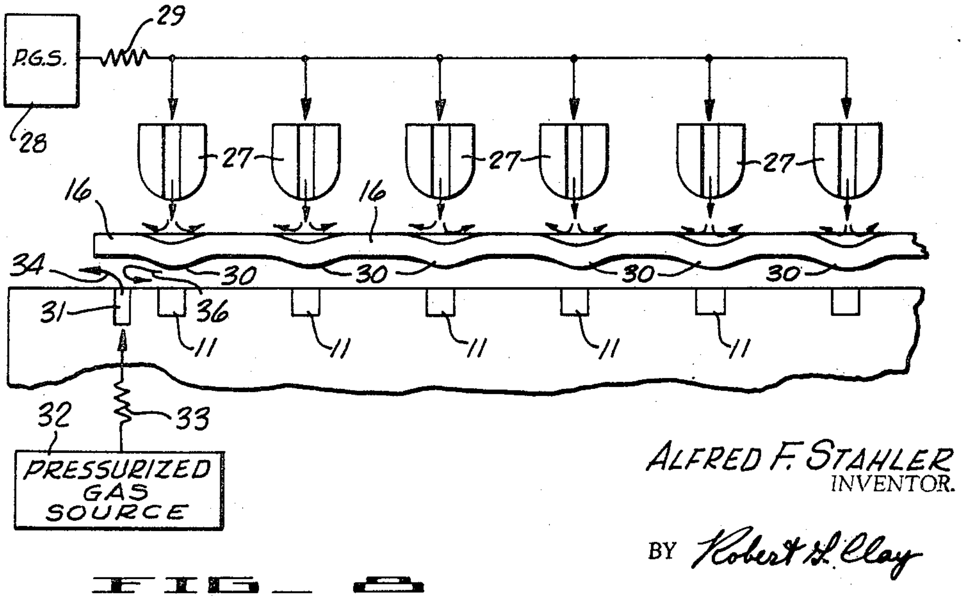
FIGURE 8 is a schematic cross-section taken on the lines 8—8 of FIGURE 1.

In FIGURE 7 is shown the shape of the tape in cross-section directly over the head area, represented by multiple heads 11 in a stack. The proportions and dimensions of the various elements are exaggerated for the sake of clarity, for it would be impossible to illustrate in a drawing of this scale the true proportion between the tape width (e.g., 1 inch), tape thickness (e.g., 0.001000 inch) film thickness $h$ (e.g. 0.000200 inch) and film thickness $h_j$ (e.g., 0.000050 inch). It will be noted in comparing FIGURES 1 and 8 that each jet 26 makes a separate blister-shaped depression and bulge 30 in the tape 16, and that these blister-shaped bulges are spaced apart sufficiently far to permit substantially uninterrupted flow of the gas film in a downstream direction, between and around the blister-shaped bulges 30.

As previously mentioned, the spacing $h$ is so small in relation to the width of the tape that lateral leakage has no effect on the spacing over most of the tape width. However at the very edges, there is some collapse of the tape, which is of disadvantage in multi-track use, when at least two heads must be positioned near the tape edges, and as close thereto as possible for most efficient use of the tape, i.e., for mounting the greatest possible number of heads with the maximum amount of shielding across the tape width. As shown on the left side of FIGURE 8, the air escapes and the tape 16 collapses near the edge. Accordingly, the present structure employs an edge groove 31 parallel to the tape length and near the tape edge, fed by a pressure source 32 through a restrictor 33. The source 32 is adjusted to provide a flow of air, represented by arrow 34, to the bearing and out of the lateral gap at the tape edge. This flow 34 is just sufficient in quantity to replace the air, represented by arrow 36, that would otherwise leak out of the air bearing film, so that in effect no air leaks from the bearing film and the tape edge does not curl down.

An actual transducing apparatus built and operated in accordance with the invention is shown in FIGURES 9–14. The transducer has two head stacks 41 and 42, each including seven heads 43 for use on seven tracks of the tape 16. The heads are mounted in a block 44 having a curved face 46, and the block is mounted within a shield 47, the whole being mounted on a base plate 48, which is mounted on the top plate of a transport by means of bolts 49. In the use intended, the tape is operated for recording and reproducing in both forward and reverse directions. Accordingly, two grooves 50 are provided transverse to the direction of movement, so that in either direction, one of the grooves 50 is upstream from the heads 43. In either direction, the downstream groove has no effect on the air film thickness $h$ at the heads 43. The grooves 50 are each fed by respective interior channels 51, 52 (one end of which is sealed by a plug 53) and 54, and by exterior conduits 56, which communicate with appropriate restrictors and a pressure source, not shown. A pair of edge grooves 57, 58 are also provided and are fed by interior channels 61, 62, 63 and 64, and by an exterior conduit 66 communicating with an appropriate restrictor and pressure source, not shown. The grooves 50 and 57, 58 in this example are approximately 6 mils wide.

In this example, the jets 26 are provided by means of a cover member 71, which is pivotably mounted for easy insertion and removal of the tape 16. For convenience of manufacture, the cover member 71 is formed in three parts: a solid central part 72, and two flanking parts 73, 74, formed as mirror images of one another. Each of the parts 73, 74 is formed with a hollow interior chamber 76 opening toward and sealed by the central part 72 when the member 71 is assembled. A series of kerfs 77 are cut in the edge of each wall confronting the heads 43 to provide the openings for the jets 26. The air supply for the jets is provided by means of a channel 78 communicating with the chamber 76 and plugged by means of a plug 79, and a communicating bore 81 aligned on the pivoting axis of the cover member 71. The parts 72–74 are retained together by means of bolts 82 and 83.

The cover member 71 is hinged on extensions 84 of the shield 47 by means of a pivot structure that also provides for transmission of air to the chambers 76 and for skew alignment and adjustment of the jets 26 with respect to the heads 43, as follows (see particularly FIGURES 13 and 14). In each extension 84 is formed an air channel 86, one end of which is plugged by means of a plug 87. An air entrance bore 88 is formed at right angles to and communicating with the bore 86 and with an exterior tube 89 leading through restrictors 28 to a pressurized air source 91. Also at right angles to and communicating with bore 86, and transpiercing the extension 84 in the same direction as, but eccentric to, the pivoting axis of the cover member, is a bore 92 into which is press fitted a manifold member 93. The member 93 has an eccentric cylindrical extension 94 that fits snugly but rotatably within the corresponding bore 81 in the cover member 71 and forms a pivot pin for the pivoting action thereof. The member 93 has an exterior bearing flange 96 engaging the extension 84 and a protruding nut head 97 adapted for engagement by a wrench or tool for turning the member 93 within the bore 92. By suitably turning both of the members 93, the alignment of the kerfs 77 may be brought into precise parallelism with the alignment of the heads 43. For transmitting the air from bore 86 to bore 81, the member 93 also has two flanges 98 and 99 at the ends of the bore 92 and a central narrowed portion 101 transpierced by a pair of bores 102 and 103; and a bore 104 is also formed along the length of extension 94. Thus the air flows freely from source 91 and through the restrictor 29, tube 89, bore 88, bore 86, bores 102 and 103, bore 104, bore 81, bore 78, chamber 76, and kerfs 77 to produce the jets 26, no matter what adjusted position the apparatus is in. Some small leakage of pressurized air at the various joints of the passage may take place, but is not of significance in reducing the air flow to the jets.

Figure 10:
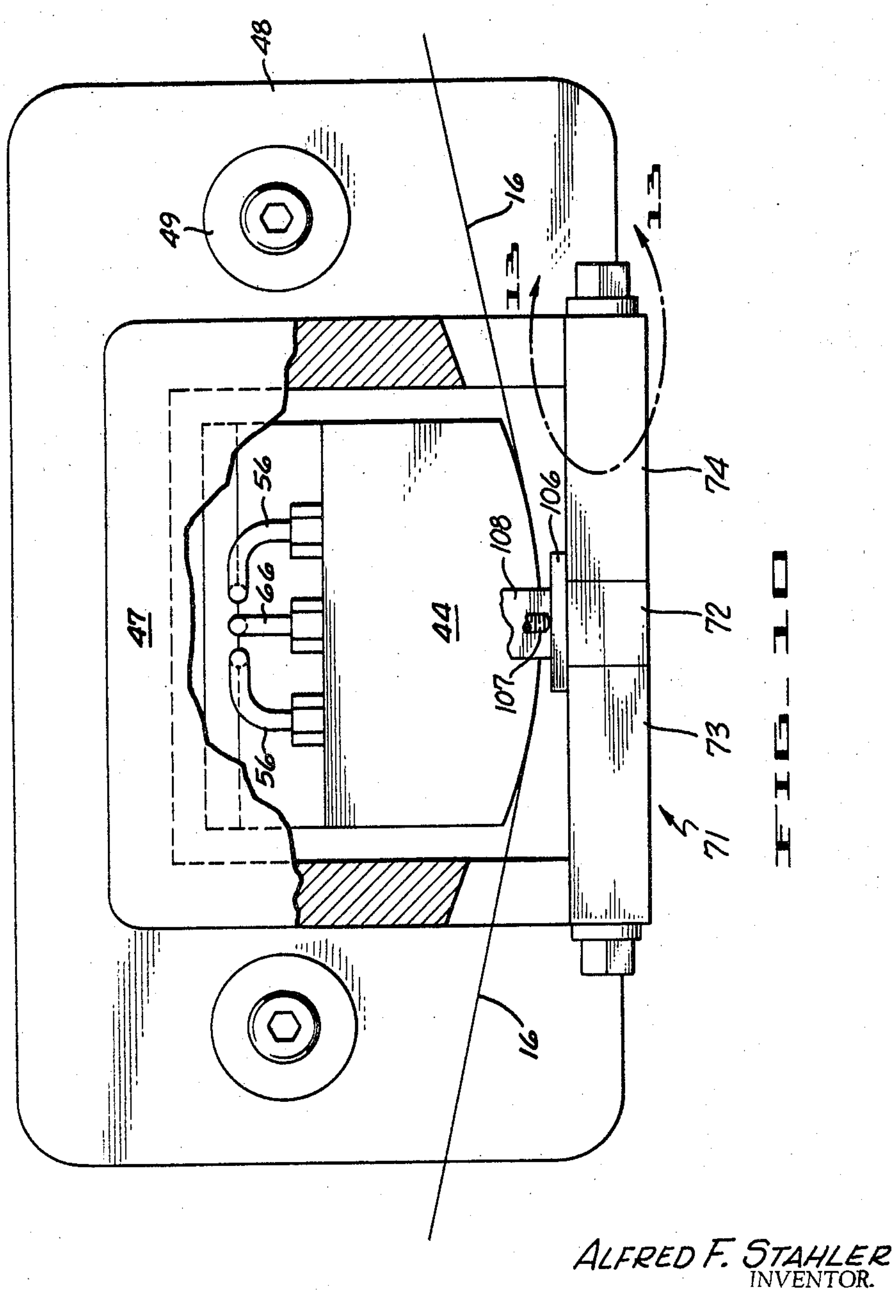
FIGURE 10 is a plan of the apparatus of FIGURE 9.
Figure 11:
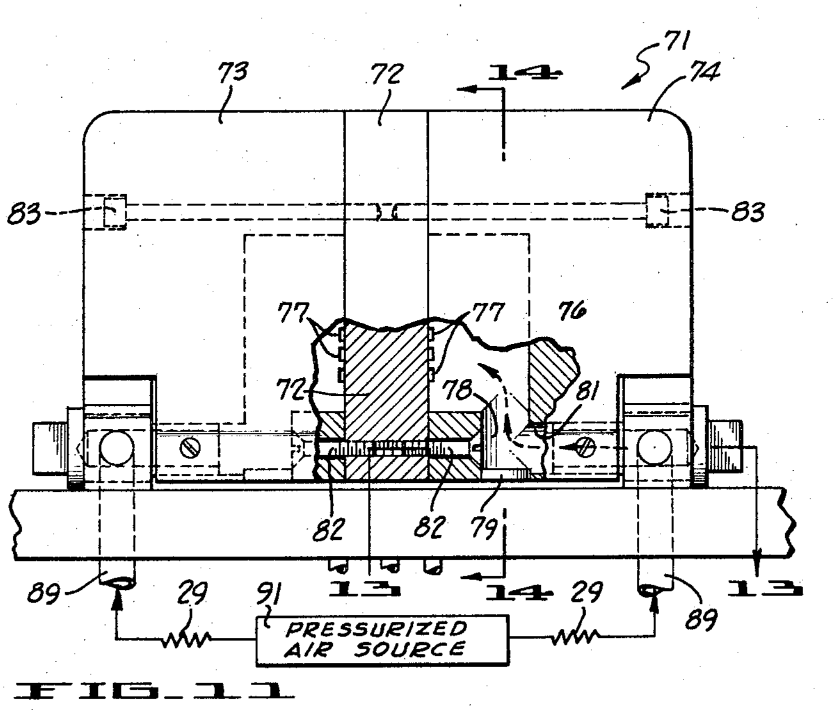
FIGURE 11 is a front elevation of the apparatus of FIGURE 9.
Figure 12:
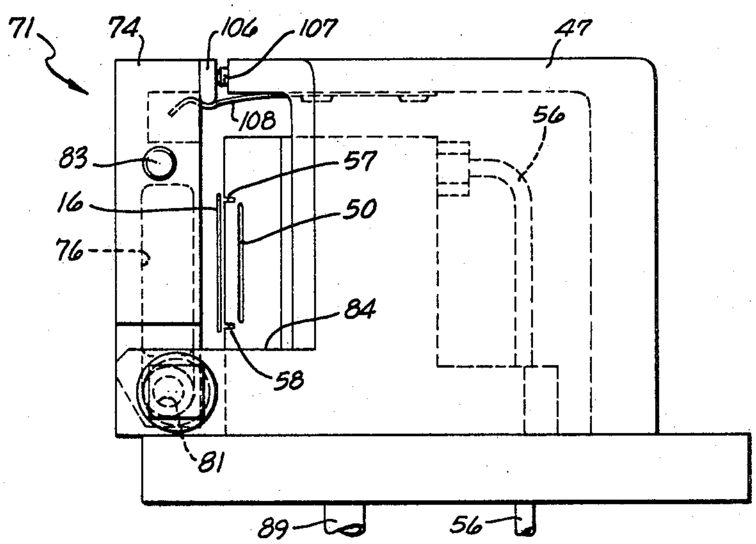
FIGURE 12 is an end elevation of the apparatus of FIGURE 9.

As shown in FIGURES 10 and 12, a latching plate 106 is secured to the cover member 71 on the side remote from the pivoting axis thereof, and is engaged by an adjustable set screw 107 and spring leaf latch 108 extending from the shield 47. By means of the screw 107, the member 71 may be brought into transverse parallelism with the tape 16 no matter how the members 93 are adjusted, and the combination of screw 107 and latch 108 ensures that the same position will be attained by cover member 71 each time it is closed with tape in place.

Parameters that were successfully used in an operating example of the above described bearing structure include: width of kerfs 77 parallel to direction of tape motion, .01 inch; length of kerfs 77 transverse to direction of tape motion, .03 inch; and restrictors 23, 29 and 33 were formed of five-inch lengths of steel tubing having an inside diameter of six mils. Head radius R was one inch. Pressures, tape speeds and tensions were shown in FIGURES 2, 3, 7 and 8.

FIGURE 15 shows the mounting of the head and bearing apparatus in a magnetic tape transport, including reels 111 and 112 and a capstan and pinch roller assembly 113 by which the tape is tensioned in a manner known in the art.

Figure 9:
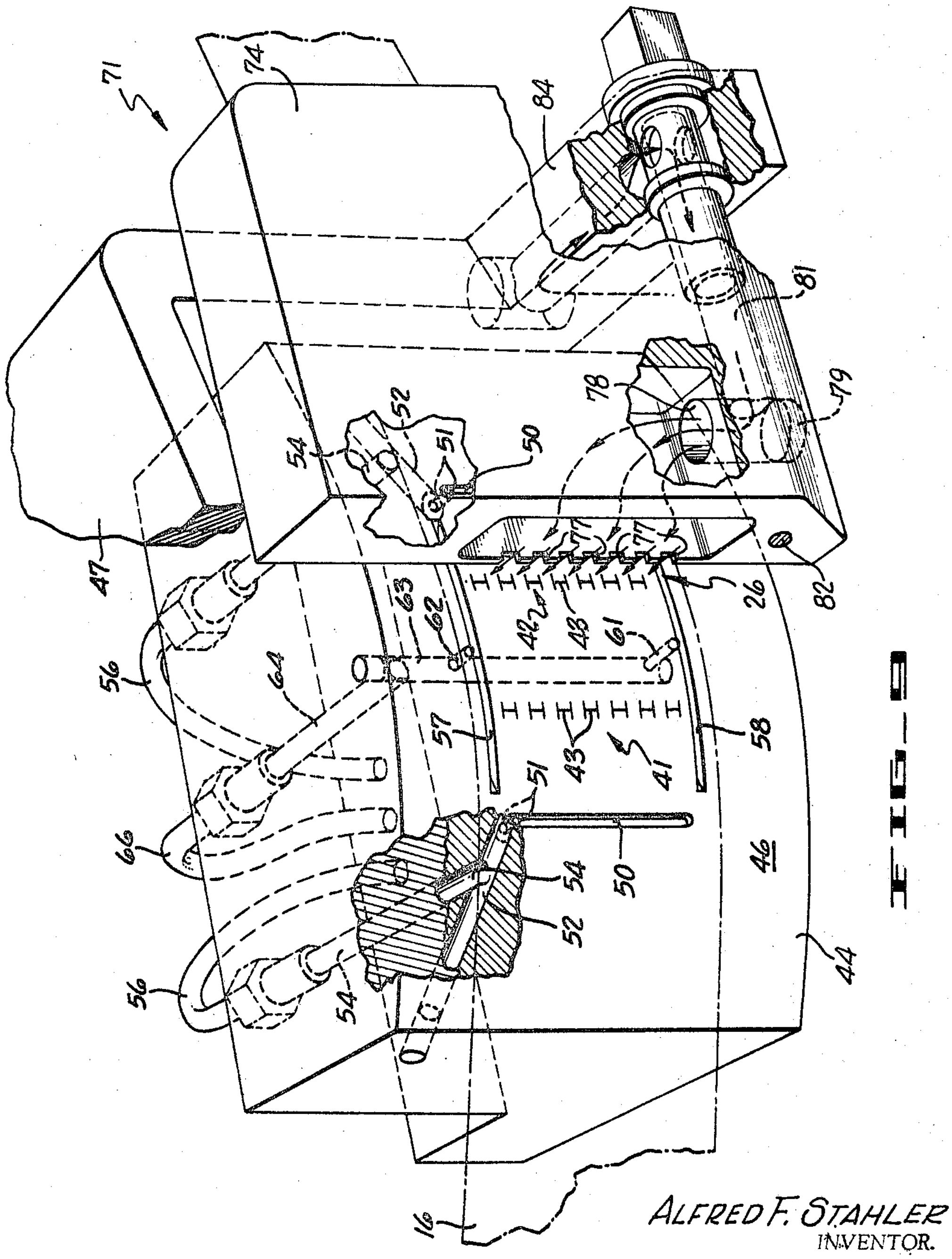
FIGURE 9 is a broken-away perspective of a bearing constructed in accordance with the invention.
Figures 16, 17, 18:
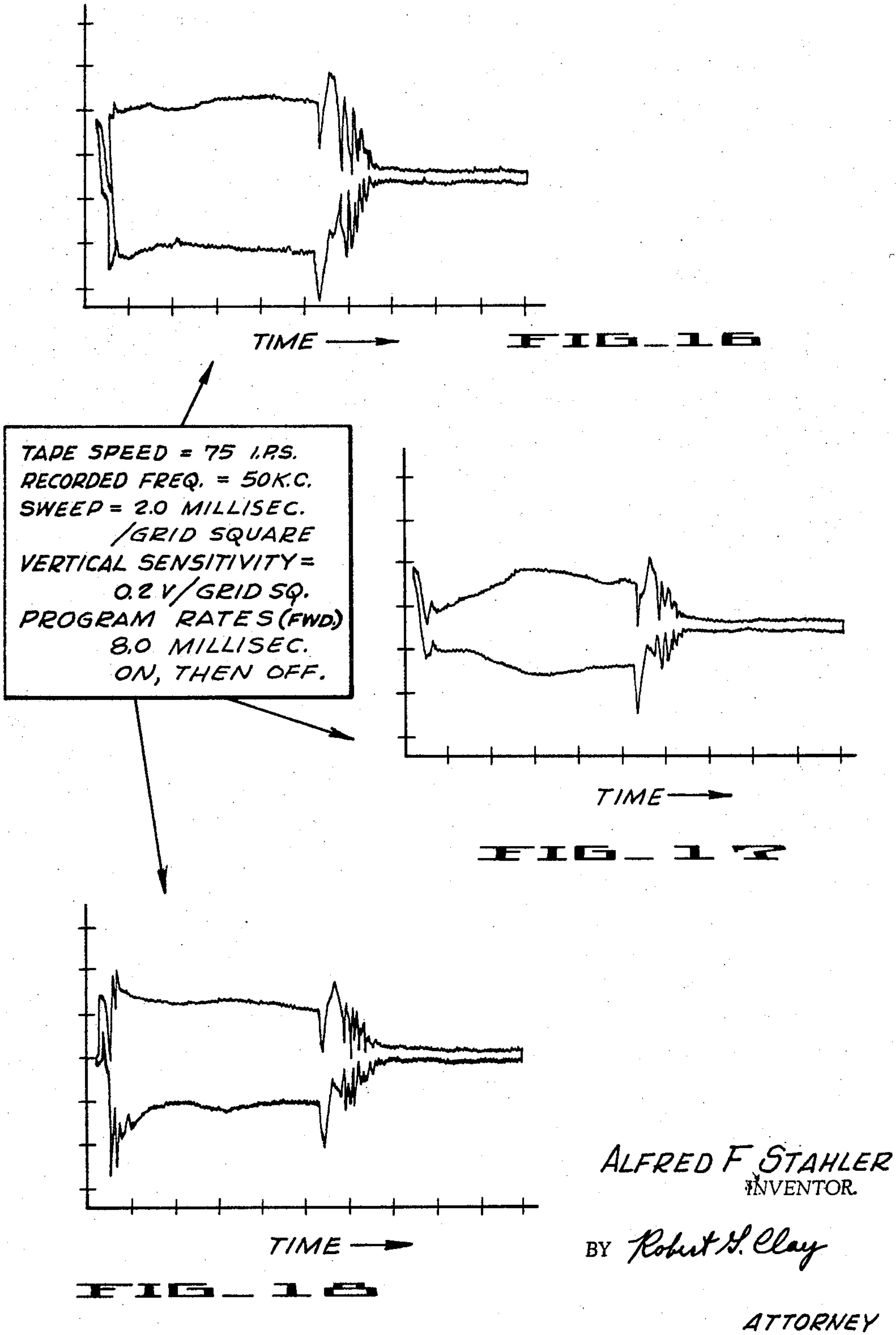
FIGURE 16 is a tracing of the envelope of an oscilloscope display illustrating the operation of the invention.
FIGURE 17 is a tracing of the envelope of an oscilloscope display illustrating the operation of the invention.
FIGURE 18 is a tracing of the envelope of an oscilloscope display illustrating the operation of the invention.

FIGURES 16–18 illustrate a further advantage of the present invention, which is the elimination of "squeeze film effect" in the operation of the bearing of FIGURE 9, in a digital tape transport, for example, requiring repeated starting, stopping and reversing of the tape at fast programming rates. For such operation, the air supply to both transverse grooves 50, the edge grooves 57, 58, and kerfs 77 is operated continuously so that the air is always flowing from these orifices whether the tape is stopped or is moving forward or in reverse. To illustrate the advantage of this device, however, FIGURE 16 shows the result when no air is flowing from either the grooves or jets; FIGURE 17 shows the result of operating with air flow from the grooves only, and no jets 26; while FIGURE 18 shows the result of operating with air flow from both grooves and jets. The maximum amplitude of the signal in FIGURE 17 is smaller than the amplitude in FIGURE 16, as would be expected, since the thickness of the air film reduces the signal strength (FIGURE 17). Furthermore, during the first five milliseconds after initiation of operation in FIGURE 17, the signal strength is considerably less than its eventual maximum and builds up at a very gentle rate. The reason for this delay is that during the period when the tape is stopped, a considerable amount of high pressure air collects under the tape and the film thickness becomes greater than it is during steady state operation. When the tape begins to move, this excess air must be squeezed out from under the tape before the desired minimum film thickness can be obtained. This process takes from two to five milliseconds, and the transient delay period must be added to the start time of each read or write cycle.

As shown in FIGURE 18, however, when the jets 26 are used, the operating film thickness is attained nearly instantaneously. This thickness is the thickness $h_j$ between the blister-shaped depressions 30 and the heads. Excess air that is trapped beneath the tap during stop periods may temporarily increase the film thickness $h$ between the rest of the tape and the bearing block, but the film thickness $h_j$ at the head, instead of being increased during the stopping period, tends rather to decrease because of the great pressure differential between the air of the jet and the air of the film. When the tape is started, a self-acting film of thickness $h_j$ is immediately established beneath the blister 30 with a pressure much greater than that of the surrounding film of thickness $h$. In fact, in the best operating region (where the film thickness $h_j$ is independent of tension as shown in FIGURES 6 and 7), the opposed pressures of the jet and film $h_j$ are of a different order of magnitude from the opposed pressures of the atmosphere and film $h$, so that the air bearing $h_j$ beneath the jet is extremely "stiff" and stable independently of the surrounding bearing $h$, not only during the starting process, but also during steady state operation. This circumstance leads to the further advantage that the bearing film $h$ in this combination need not be limited to operation in the "stable" area illustrated in FIGURE 2. For example, with a tape tension of 1.0 lb./in. and a source pressure $P_S$ of 1.09 p.s.i.g., which is the condition of FIGURE 6, the bearing $h$ is clearly operating in the "unstable" area of FIGURE 2 with a film thickness $h$ of approximately 150–200 microinches, while yet the film thickness $h_j$ (FIGURE 6) may be stably established at about 30 microinches by using a jet source pressure of 2.95 p.s.i.g.

It will be understood that the present invention is not limited to use of the jets 26 in combination with a bearing film produced by the pressure source 22 and groove 18 (FIGURE 1), and that the jets 26 may also be used with a bearing film $h$ established entirely by the self-acting effect, or by emission of air from a porous surface, or by any other means presently known or unknown to the art.

Thus there has been described a bearing in which a relatively thick pressurized gas film is established between a tape and a bearing surface in which a transducing head is mounted, and the tape is locally depressed in the immediate vicinity of the head by means of a pressurized gas jet applied to the side of the tape opposite the head.

What is claimed is:

1. In a magnetic tape transducing apparatus of the type in which tape is tensioned around the curved surface of a head having a magnetic transducing gap inset therein and is spaced from said surface and gap by a pressurized fluid film flowing in an upstream-to-downstream direction, the combination comprising:
   a nozzle for directing a jet of pressurized fluid at the side of said tape directly opposite said gap so as to produce a localized depression in said side of said tape and a corresponding bulge on the other side of said tape directly confronting said gap; and
   means for supplying pressurized fluid to said nozzle;
   whereby the spacing between said tape and gap in the region of said jet and bulge is stably and precisely establish as a function of the pressure in said jet.

2. In a magnetic tape transducing apparatus of the type in which tape is tensioned around the curved surface of a head having a magnetic transducing gap inset therein and is spaced from said surface and gap by a pressurized air film flowing in an upstream-to-downstream direction, the combination comprising:
   a nozzle for directing a jet of pressurized air at the side of said tape directly opposite said gap so as to produce a localized depression in said side of said tape and a corresponding bulge on the other side of said tape directly confronting said gap; and
   means for supplying pressurized air to said nozzle;
   whereby the spacing between said tape and gap in the region of said jet and bulge is stably and precisely established as a function of the pressure in said jet.

3. In a magnetic tape transducing apparatus of the type in which tape is tensioned around the curved surface of a head having a magnetic transducing gap inset therein and moved around said surface so as to produce a pressurized air film flowing in an upstream-to-downstream direction and spacing said tape from said gap, the combination comprising:
   a nozzle for directing a jet of pressurized air at the side of said tape directly opposite said gap so as to produce a localized depression in said side of said tape and a corresponding bulge on the other side of said tape directly confronting said gap; and means for supplying pressurized air to said nozzle;

whereby the spacing between said tape and gap in the region of said jet and bulge is stably and precisely established as a function of the pressure in said jet.

4. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to control the thickness of said film at said gap, the combination comprising:

a nozzle for directing a jet of pressurized air at the side of said tape directly opposite said gap so as to produce a localized depression in said side of said tape and a corresponding bulge on the other side of said tape directly confronting said gap; and means for supplying pressurized air to said nozzle;

whereby the spacing between said tape and gap in the region of said jet and bulge is stably and precisely established as a function of the pressure in said jet.

5. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to feed a supplemental flow of air into said film upstream from said transducing gap to control the thickness of said film at said gap, the combination comprising:

a nozzle for directing a jet of pressurized air at the side of said tape directly opposite said gap so as to produce a localized depression in said side of said tape and a corresponding bulge on the other side of said tape directly confronting said gap; and means for supplying pressurized air to said nozzle;

whereby the spacing between said tape and gap in the region of said jet and bulge is stably and precisely established as a function of the pressure in said jet.

6. In a magnetic tape transducing apparatus of the type in which tape is tensioned around the curved surface of a head having a magnetic transducing gap inset therein and said tape is moved around said surface alternatively in both longitudinal directions so as to establish a pressurized air film flowing in an upstream-to-downstream direction and spacing said tape from said gap, said head having a pair of recesses formed in said surface entirely beneath said tape and at zones that are respectively upstream from said transducing gaps in each of said longitudinal directions of tape motion, and an air pressure source coupled to said recesses and cooperating therewith to feed a supplemental flow of air into said film upstream from said transducing gap to control the thickness of said film at said gap, the combination comprising:

a nozzle for directing a jet of pressurized air at the side of said tape directly opposite said gap so as to produce a localized depression in said side of said tape and a corresponding bulge on the other side of said tape directly confronting said gap; and means for supplying presurized air to said nozzle;

whereby the spacing between said tape and gap in the region of said jet and bulge is stably and precisely established as a function of the pressure in said jet.

7. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to control the thickness of said film at said gap, the combination comprising:

a cover member mounted in spaced parallel relation to and confronting said tape and bearing member face;

said cover member having an interior chamber formed therein and being provided with a jet nozzle opening from said chamber and directly confronting said tape and head gap; and a source of pressurized air coupled to said chamber so as to produce a jet of said air emanating from said jet nozzle and causing a localized depression in said side of said tape and a corresponding bulge on the other side of said tape directly confronting said head gap;

whereby the spacing between said tape and head member in the region of said jet and bulge is stably and precisely established as a function of the pressure in said jet.

8. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to control the thickness of said film at said gap, the combination comprising:

a cover member and means for mounting said cover member for pivoting motion around a predetermined axis that is generally parallel to the length of said tape, said pivoting motion being between an operative position in which said cover member is in spaced parallel relation to and confronting said tape and surface and a tape-changing position in which said cover member is withdrawn from and is substantially normal to the generatrices of said surface of said head;

said cover member having an interior chamber formed therein and being provided with a jet nozzle opening from said chamber and directly confronting said tape and head gap;

said means for mounting said cover member including a pair of mounting members bracketing said cover member on the line of said axis, and a pair of pivot pin elements journaled for rotation in said mounting members on an axis that is generally parallel to the length of said tape but displaced from said rotational axis of said cover member, said pin elements each having an eccentric right circular cyclindrical extension centered on said cover member axis and extending into conforming recesses in said cover member for pivoting of said cover member about said cylindrical extensions; and a source of pressurized air coupled to said chamber so as to produce a jet of said air emanating from said jet nozzle and causing a localized depression in said side of said tape and a corresponding bulge on the other side of said tape directly confronting said head gap;

whereby the spacing between said tape and gap in the region of said jet and bulge is stably and precisely established as a function of the pressure in said jet.

9. In a magnetic tape transducing apparatus of the type in which tape is tensioned around the curved surface of a head having a magnetic transducing gap inset therein and said tape is moved around said surface so as to establish a pressurized air film flowing in an upstream-to-downstream direction and spacing said tape from said gap, said head having a recess formed in said surface entirely beneath said tape and upstream from said transducing gap, and an air pressure source coupled to said recess and cooperating therewith to control the flow of said air upstream from said transducing gap to control the thickness of said film at said gap, the combination comprising:

a cover member and means for mounting said cover member for pivoting motion around a predetermined axis that is generally parallel to the length of said tape, said pivoting motion being between an operative position in which said cover member is in spaced parallel relation to and confronting said tape and surface and a tape-changing position in which said cover member is withdrawn from and is substantially normal to the generatricies of said surface of said head;

said means for mounting said cover member including a pair of mounting members bracketing said cover member on the line of said axis, and a pair of pivot pin elements journaled for rotation in said mounting members on an axis that is generally parallel to the length of said tape but displaced from said rotational axis if said cover member, said pin elements each having an eccentric right circular cylindrical extension centered on said cover member axis and extending into conforming recesses in said cover member for pivoting of said cover member about said cylindrical extensions;

said cover member having an interior chamber formed therein and being provided with a jet nozzle opening from said chamber and directly confronting said tape and head gap, said cover member also having at least one channel formed therein and communicating btween said chamber and a corresponding one of said conforming recesses, the pivot pin member that extends into said one conforming recess having an axial channel formed therein communicating with said one conforming recess and with the interior of the corresponding mounting member, and said corresponding mounting member having an interior channel surrounding said corresponding pivot pin member and defining a manifold communicating with said axial channel thereof in all positions of rotation of said pivot pin member with respect to said corresponding mounting member, said interior channel having an orifice at the surface of said mounting member remote from said corresponding pivot pin member; and a source of pressurized air coupled to said orifice so as to produce a jet of said air emanating from said jet nozzle and causing a localized depression in said side of said tape and a corresponding bulge on the other side of said tape directly confronting said head gap;

whereby the spacing between said tape and gap in the region of said jet and bulge is stably and precisely established as a function of the pressure in said jet.

10. In a magnetic tape transducing apparatus of the type in which tape is tensioned around the curved surface of a head having a plurality of magnetic transducing gaps inset therein and said tape is moved around said surface so as to establish a pressurized air film flowing in an upstream-to-downstream direction and spacing said tape from said gap, said head having a recess formed in said surface entirely beneath said tape and upstream from said transducer gap, and an air pressure source coupled to said recess and cooperating therewith to control the flow of said air upstream from said transducing gap to control the thickness of said film at said gap, the combination comprising:

a cover member and means for mounting said cover member for pivoting motion around a predetermined axis that is generally parallel to the length of said tape, said pivoting motion being between an operative position in which said cover member is in spaced parallel relation to and confronting said tape and surface and a tape-changing position in which said cover member is withdrawn from and is substantially normal to the generatrices of said surface of said head;

said cover member having an interior chamber formed therein and being provided with a jet nozzle opening from said chamber and directly confronting said tape and head gap;

said means for mounting said cover member including a pair of mounting members bracketing said cover member on the line of said axis, and a pair of pivot pin elements journaled for rotation in said mounting members on an axis that is generally parallel to the length of said tape but displaced from said rotational axis of said cover member, said pin elements each having an eccentric right circular cylindrical extension centered on said cover member axis and extending into conforming recesses in said cover member for pivoting of said cover member about said cylindrical extensions;

said cover member having an interior chamber formed therein and being provided with a plurality of jet nozzles opening from said chamber and directly confronting said tape and head gaps, said cover member also having at least one channel formed therein and communicating between said chamber and a corresponding one of said conforming recesses, the pivot pin member that extends into said one conforming recess having an axial channel formed therein communicating with said one conforming recess and with the interior of the corresponding mounting member, and said corresponding mounting member having an interior channel surrounding said corresponding pivot pin member and defining a manifold communicating with said axial channel thereof in all positions of rotation of said pivot pin member with respect to said corresponding mounting member, said interior channel having an orifice at the surface of said mounting member remote from said corresponding pivot pin member; and a source of pressurized air coupled to said orifice so as to produce jets of said air emanating from said jet nozzles and causing localized depressions in said side of said tape and corresponding bulges on the side of said tape directly confronting said head gaps;

whereby the spacing between said tape and head gaps in the region of said jets and bulges is stably and precisely established as a function of the pressure in said jets.

11. In a magnetic tape transducing apparatus of the type in which tape is tensioned around the curved surface of a head having a plurality of magnetic transducing gaps inset therein and said tape is moved around said surface alternatively in both longitudinal directions so as to establish a pressurized air film flowing in an upstream-to-downstream direction and spacing said tape from said gap, said head having a pair of recesses formed in said surface entirely beneath said tape and at zones that are respectively upstream from said transducing gaps in each of said longitudinal directions of tape motion, and an air pressure source coupled to said recesses and cooperating therewith to feed a supplemental flow of said air into said film upstream from said transducing gap to control the thickness of said film at said gap, the combination comprising:

a cover member and means for mounting said cover member for pivoting motion around a predetermined axis that is generally parallel to the length of said tape, said pivoting motion being between an operative position in which said cover member is in spaced parallel relation to and confronting said tape and surface and a tape-changing position in which said cover member is withdrawn from and is substantially normal to the generatrices of said surface of said head;

said means for mounting said cover member including a pair of mounting members bracketing said cover member on the line of said axis, and a pair of pivot pin elements journaled for rotation in said mounting members on an axis that is generally parallel to the length of said tape but displaced from said rotational axis of said cover member, said pin elements each having an eccentric right circular cylindrical extension centered on said cover member axis and extending into conforming recesses in said cover member for pivoting of said cover member about said cylindrical extensions;

said cover member having an interior chamber formed therein and being provided with a plurality of jet nozzles opening from said chamber and directly confronting said tape and head gaps, said cover member also having at least one channel formed therein and communicating between said chamber and a corresponding one of said conforming recesses, the pivot pin member that extends into said one conforming recess having an axial channel formed therein communicating with said one conforming recess and with the interior of the corresponding mounting member, and said corresponding mounting member having an interior channel surrounding said corresponding pivot pin member and defining a manifold communicating with said axial channel thereof in all positions of rotation of said pivot pin member with respect to said corresponding mounting member, said interior channel having an orifice at the surface of said mounting member remote from said corresponding pivot pin member; and a source of pressurized air coupled to said orifice so as to produce jets of said air emanating from said jet nozzles and causing localized depressions in said side of said tape and corresponding bulges on the other side of said tape directly confronting said head gaps;

whereby the spacing between said tape and head gaps in the region of said jets and bulges is stably and precisely established as a function of the pressure in said jets.

References Cited

UNITED STATES PATENTS

| | | |
|---|---|---|
| 3,151,796 | 10/1964 | Lipschutz. |
| 3,036,304 | 5/1962 | Willard. |
| 3,219,990 | 11/1965 | Goehle. |

BERNARD KONICK, *Primary Examiner.*

VINCENT P. CANNEY, *Assistant Examiner.*

U.S. Cl. X.R.

179—100.2